United States Patent

[11] 3,615,894

[72] Inventor Francis Clyde Rauch
 Stamford, Conn.
[21] Appl. No. 855,399
[22] Filed Sept. 4, 1969
[45] Patented Oct. 26, 1971
[73] Assignee American Cyanamid Company
 Stamford, Conn.

[54] CHEMICAL TREATMENT OF METAL
 10 Claims, No Drawings
[52] U.S. Cl. ............................................ 148/6.15 R,
 148/6.27, 148/31.5, 260/946
[51] Int. Cl. ............................................ C23f 7/08
[50] Field of Search .......................................... 148/6.15,
 31.5, 6.27; 252/396; 260/943, 941, 946

[56] References Cited
 UNITED STATES PATENTS
2,268,158  12/1941  Marvel ......................... 260/946

Primary Examiner—Ralph S. Kendall
Attorney—Frank M. Van Riet

ABSTRACT: A method for preparing metal surfaces for receipt of a coating such as a paint or adhesive (whereby increased coating adhesion and corrosion resistance is achieved) and the treated metal per se, are disclosed. The method comprises contacting the metal surface with various phosphinyl derivatives.

CHEMICAL TREATMENT OF METAL

BACKGROUND OF THE INVENTION

The use of various chemical materials in the treatment of metal surfaces to thereby render them corrosion resistant is well known to those skilled in the art. For example, U.S. Pat. No. 1,798,218 describes a method whereby certain molybdenum compounds are utilized, whereas U.S. Pat. No. 1,911,537 discloses the use of dicarboxylic and hydroxy-dicarboxylic acids for the same purpose. Phosphoric acid salts, U.S. Pat. Nos. 1,936,533; 1,936,534; 2,952,669 ) phosphates, (U.S. Pat. Nos. 2,224,695; 2,472,099; 2,769,737 ) and orthophosphoric acid-chlorinated hydrocarbon solutions, (U.S. Pat. No. 2,789,070) have also been disclosed for similar purposes.

While these prior art techniques generally provide acceptable corrosion resistance, they usually fail in regard to the adhesion of surface coatings such as paints, varnishes, enamels, adhesives etc. thereto. Additionally, many of these antiquated systems are severely polluted by water, i.e., when contacted with water they tend to peel, blister etc.

SUMMARY

I have found that the adhesion of coatings to metals can be materially increased or strengthened by first treating the metal with a chemical material which is chemisorbed, i.e., chemically reacted with or absorbed via strong bonds. In this manner, a foundation or integral chemical or chemically bound coating is formed on the metal surface via reaction with the metal, which foundation is then more susceptible to an ultimate or surface coating such as a paint or adhesive, than materials utilized in the past. My method results in coatings which are more securely bonded or adhered to the foundation layer because he foundation is chemically bonded to the metal and, in a preferred embodiment, an ultimate coating is chemically bonded to the foundation. That is to say, upon treating the metal according to my novel method, a reaction, as mentioned above, causes a strong bonding of the phosphinyl derivative layer to the metal. There then remains, in my preferred embodiment, a second reactive group in the phosphinyl derivative layer, which group is free to react with an exterior surface coating. This free reactive group chemically combines with the surface coating applied thereto to produce a metal having a coating tightly bonded thereto. Additionally, the corrosion resistance of the metal treated according to the present invention, with or without an extraneous coating on its surface, is at least as effective and in many cases, better than known corrosion resistant systems.

DESCRIPTION OF THE INVENTION INCLUDING PREFERRED EMBODIMENTS

My novel process comprises treating a metal surface, such as that of aluminum, steel, iron, copper, titanium, etc. with a reactive phosphinyl derivative. The useful phosphinyl derivatives have the formula (I) 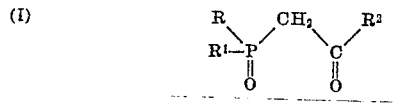

wherein R and R' are, individually, a phenyl group, an alkyl group of one-four carbon atoms, inclusive, an alkoxy group of one-four carbon atoms, inclusive, a benzyl group, a vinyl group, a substituted phenyl group, a substituted alkyl group of one-four carbon atoms, inclusive, a substituted alkoxy group of one -four carbon atoms, inclusive, or a substituted benzyl group, said substituents comprising $NH_2$, OH, SH or a polymerizable $\alpha, \beta$-ethylenically unsaturated aliphatic group and Re is $NH_2$, OH, SH or any group represented by R, above.

While not wishing to be bound by any particular theory, I believe that the C=O and P=O groups of the phosphinyl derivatives react with the oxide layer formed on the surface of the metal to be treated. The existence of such oxide layers is well recognized by cogent workers in the art. Such layers form upon exposure of the metal to the atmosphere. After the phosphinyl derivative-oxide bonding is complete, the reactive groups of the phosphinyl foundation layer, if any, are then free to react with the surface coating, i.e., paint, adhesive etc., thereby chemically bonding the coating to the metal. The phosphinyl derivative-oxide bonding is pseudochemical in nature and can be more accurately described as a chemisorption or chelation of the derivative by the metal.

The phosphinyl derivative foundation layer may be applied to the metal surface, the metal first being thoroughly cleaned such as by degreasing with trichlorethylene etc., or other common techniques, by immersing, dipping, painting, brushing, wiping, spraying etc. the metal article to be treated with solutions of one or more of said phosphinyl derivatives, for a length of time such that the metal surface absorbs or reacts with a sufficient amount of the derivative. The metal is then merely removed from the solution and allowed to dry.

Additionally, the phosphinyl derivative can be applied to the metal by first incorporating it into the surface coating material, e.g., the paint or adhesive, and then applying the surface coating. In this manner, the phosphinyl derivative can be added, for example, to the paint vehicle, and the paint then can be sprayed etc. onto the metal. Similarly, the phosphinyl derivative can be added to one part of a two-part adhesive system and the adhesive can then be applied to the metal. In each instance, the reactive groups of the surface coating material will react with the appropriate groups of the phosphinyl derivative, if present, while the derivative itself reacts with the oxide on the metal surface, as more specifically described above.

The solution of phosphinyl derivative can comprise from about one part to about 50 parts of the derivative per 1,000 parts of solvent, e.g., ethanol, methanol, water etc. The treatment is preferably conducted at room temperature although higher or lower temperatures may be utilized, if desired. Complete chemisorption of the phosphinyl derivative onto the metal surface is generally achieved in from about 10 to about 20 minutes, the lower the derivative concentration, the longer the reaction time necessary.

As mentioned above, when a group reactive with the surface coating or layer is present on the phosphinyl derivative, the foundation layer of derivative affords a chemically available site whereby the reactive groups of a paint or adhesive layer may chemically react to thereby form a tightly adhering coating or layer. Examples of paints, adhesives or other coating or layer. Examples of paints, adhesives or other coatings which may be used include epoxy paints and adhesives, i.e. those containing chemically available

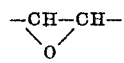

groups; urethane paints and adhesives, i.e., those containing chemically available NCO groups; acrylic paints and adhesives, i.e. those containing chemically available

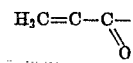

groups; vinyl paints and adhesives, i.e., those containing chemically available —Ch=Ch—groups and the like. As is clear from the enumeration of the chemically available groups of the above-mentioned coatings, the available group may be free to react with the available group of the phosphinyl derivative layer previously applied to the metal surface. These reactive groups are explicitly represented, as discussed above, by $NH_2$, OH, SH and unsaturated aliphatic groups and in the case of epoxy and urethane paints and adhesives would be $-NH_2$, —OH Or —SH substituted groups, while in the case of acrylic or vinyl paints and adhesives, the reactive group of the phosphinyl derivative would be the unsaturated substituent, including vinyl, allyl etc.

The coating, e.g., a paint, can be applied in a condition such that the reaction concurs while the paint vehicle evaporates or in a condition that the paint must more completely polymerize or cure before it forms a useful coating. In the latter case, if the functional group of the phosphinyl derivative is such that it initiates polymerization of the paint, the paint may be applied in a prepolymer or semipolymer condition. An example of such a treatment is illustrated by the use of an hydroxy group containing derivative and an epoxy prepolymer. In this case, the hydroxy group both reacts with and cures (polymerizes) the epoxy prepolymer.

Additionally, I have found that my novel processing procedure can be utilized in conjunction with known procedures to obtain a pseudosynergistic effect. For example, I can improve the corrosion resistance of metals treated according to my invention by first treating the metal with an inorganic chromate in a manner known in the art. Furthermore, the chromate (e.g., potassium dichromate; chromic acid solution, etc.) may be incorporated into the solution of phosphinyl derivative of my novel method before treating the metal according to my invention. In this manner, the corrosion resistance of the metal is further increased without loss of the enhanced surface coating adherence mentioned above.

The phosphinyl derivatives utilized in the present invention are well known to those skilled in the art as are methods for their production. Generally, they may be produced by the crossed Claisen Condensation Reaction, see Morrison et al., "Organic Chemistry," Allyn & Bacon, Inc., Boston, 1959, page 703. A typical reaction would proceed according to the equation:

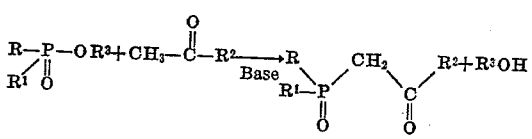

$R^3$ being as represented by R, $R^1$ or $R^2$, above. An additional method consists in using a halide according to the equation:

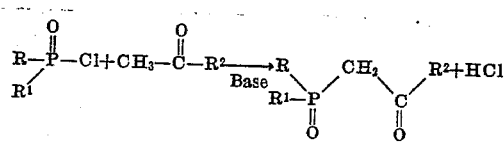

The pretreating process and products of the instant invention find utility in military, industrial and consumer fields such aircraft and ship surfaces, cooling towers, heat exchangers, window screens, siding, etc.

The following examples are set forth for purposes of illustration only and are not meant to be construed as limitations on the present invention except as set forth in the appended claims. All parts and percentages are by weight unless otherwise specified.

EXAMPLE 1

In determining the corrosion rate according to table I, a modified polarographic apparatus is used. The apparatus includes an appropriate experimental cell, a potentiostat and recorder. A three electrode system is used: (1) an aluminum electrode; (2) a calomel reference electrode and (3) a platinum counter electrode. The aluminum electrode is 0.030 inch diameter wire which is potted with a commercially available epoxy resin which is then sanded off so that the actual electrode area is the longitudinal cross section of the wire. For the control, the samples are merely untreated electrodes. For examples 1–6, the freshly polished aluminum electrode is dipped in a solution of the phosphinyl derivative for about 10 minutes.

After treatment, the aluminum electrode is placed in the cell and the appropriate electrical connections to the potentiostat made. The electrolyte is a citrate buffer of pH 4.6. The initial potential of the aluminum electrode is then set at $-1.0$ volts, with respect to the reference electrode. The voltage scan is then turned on. A sweep rate of 0.2 volts/minute in the positive direction is used and the current developed is measured on the recorder. The resulting polarization curve, voltage on the X-axis and the current on the Y-axis, may then be analyzed to give the corrosion rate.

The method of analysis is that used by Evans et al., J. Electrochem. Soc. 108, 509 (1961).

TABLE I

| Example | Phosphinyl derivative | Solvent | Corrosion rate (mg./dm.² day) | Breakdown potential (volts) |
|---|---|---|---|---|
| Control | No treatment | | 6.43 | −.59 |
| 1 | 1-dimethylphosphinyl)-2-propanone | Water | 0.92 | +.78 |
| 2 | 1-(diphenylphosphinyl)-2-propanone | do | 1.05 | +.81 |
| 3 | 1(dibenzylphosphinyl)-3-phenyl-2-propanone | do | 1.56 | +.73 |
| 4 | 1-(benzylmethylphosphinyl)-2-propanone | do | 0.75 | +.77 |
| 5 | 1-(dimethylphosphinyl)-2-butanone | do | 1.38 | +.82 |
| 6 | 2-(dimethoxyphosphinyl)acetamide | do | 1.50 | +.92 |

EXAMPLE 7

Aluminum panels, 3×5inches, are degreased by dipping in benzene and further cleaned by dipping in a hot 10 percent solution of a commercially available aluminum cleaner. The panels are then allowed to dry in air. One panel is then immersed in a solution of 2-(dimethoxyphosphinyl)acetamide in water. After 15 minutes the panel is removed and allowed to dry.

The panel is then spray painted with a commercially available epoxy paint and allowed to dry and cure for 5 days at room temperature.

The painted panel is then subjected to a modified version of the "Cross-Hatch Tape Test" formulated by the National Coil Coaters Association. In the test, the painted surface is cut 10 times vertically and 10 times horizontally with a razor blade, the scratch lines being approximately 5 mm. apart. Scotch cellophane tape No. 600 is applied over the test area and rubbed with sufficient pressure to remove all air bubbles. The panel is allowed to set for 10 minutes and the tape is then removed sharply with a pull at right angles to the test surface. A visual examination allows a reasonably accurate estimation of the percent finish remaining on the panel in the test area.

The average results of test conducted on panels treated according to example 7, in addition to the results recorded utilizing different phosphinyl derivatives according to the process of the present invention, are set forth in table II.

TABLE II

| Example | Phosphinyl derivative | Solvent | Average percent of finish remaining | Number of panels tested |
|---|---|---|---|---|
| 7 | 2-(dimethoxyphosphinyl)acetamide | Water | 95 | 6 |
| 8 | 2[bis(p-hydroxyphenyl)phosphinyl]-4'-hydroxyacetophenone | do | 82 | 6 |
| 9 | 1-(p-aminophenyl)-3-[bis(p-aminobenzyl)-phosphinyl]-2-propanone | do | 84 | 6 |
| 10 | [pis(p-mercaptophenyl)phosphinyl]acetaldehyde | do | 79 | 6 |
| 11 | [bis(hydroxymethyl)phosphinyl]acetic acid | do | 83 | 6 |
| 12 | Control (no treatment) | | 20 | 30 |

EXAMPLE 13

Utilizing the procedure of example 1 except that 1-[(aminomethoxy)methylphosphinyl]-2-propanone is employed, a corrosion resistant panel is produced.

EXAMPLE 14

The procedure of example 7 is followed except that 2-[bis(p-vinylphenyl)phosphinyl]acetamide is utilized as the foundation layer and the surface coating is a commercially available white acrylic paint. A panel similar in surface coating retention to that of said example is obtained.

EXAMPLE 15

The procedure of example 7 is again followed except that after cleaning the surface of the metal panel with a degreasing agent and an alkali cleaning agent, 3 parts of 1-[bis-(p-hydroxylbenzyl)phosphinyl]2-hexanone are added to 100 parts of the catalyst-curing agent package of a commercially available, 2-package polyurethane adhesive composition. After blending the contents of the two packages together, the resultant mixture is applied to the clean aluminum panel and cured under the recommended conditions. The adhesive is bonded more tightly to the metal panel than it is on a control specimen formed without the added hexanone.

EXAMPLE 16

The procedure of example 7 is again followed except that in place of the epoxy paint used therein, a commercially available epoxy adhesive is used. The bonding of the adhesive to the metal is similar to that of the paint of said example.

EXAMPLE 17

The procedure of example 14 is again followed except that a commercially available vinyl paint is used in place of that paint of said example and the metal used is steel. The adhesion of the paint to the steel panel is superior to that of a panel coated without the foundation layer of propanedione.

EXAMPLE 18

The procedure of example 1 is again followed except that the metal treated is stainless steel. Similar results are recorded.

EXAMPLE 19

Following the procedure of example 1 except that the metal treated is carbon steel, effective corrosion resistance is observed.

EXAMPLE 20

The procedure of example 7 is followed with replacement of the aluminum panels with similar shaped sections of titanium sheet. The adherence of the epoxy paint to the phosphinyl derivative foundation layer is 35 percent (control—no treatment—0 percent).

EXAMPLE 21

The use of nickel sheet for the aluminum panel of example 3 results in a good corrosion resistant panel.

EXAMPLE 22

The process of example 10 is followed except that a commercially available, corrosion resistant nickel-chromium alloy is used in place of the aluminum panels thereof. The average percent of finish remaining after applying the tape test is 74 percent, 6 panels tested.

I claim:

1. A method which comprises coating a metal surface with a compound having the formula

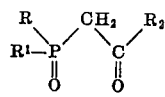

wherein R and $R^1$ are, individually, a phenyl group, an alkyl group of one–four carbon atoms, inclusive, an alkoxy group of one–four carbon atoms, inclusive, a benzyl group, a vinyl group, a substituted phenyl group, a substituted benzyl group, a substituted alkoxy group of one–four carbon atoms, inclusive, or a substituted alkyl group of one–four carbon atoms, inclusive, the substituents comprising $N_2$, OH, SH or a polymerizable $\alpha$, $\beta$-ethylenically 2aliphatic group and $R^2$ is $NH_2$, OH, SH or any group represented by R, above.

2. An article of manufacture comprising a metal surface having coated thereon a compound having the formula set forth in claim 1.

3. A method according to claim 1 wherein the meant surface is coated with said compound and a surface coating having groups chemically reactive with at least one of the groups of said compound is coated thereon.

4. A method according to claim 1, wherein said compound is coated onto said metal surface as a mixture with a surface coating having groups chemically reactive with at least one of the groups of said compound.

5. A method according to claim 1, wherein said compound is dimethyl 2-phosphonoacetamide.

6. A method according to claim 1 wherein said metal is aluminum.

7. A method according to claim 3 wherein said surface coating is a paint.

8. A method according to claim 4, wherein said surface coating is a paint.

9. A method according to claim 3 wherein said surface coating is an adhesive.

10. An article according to claim 2 wherein said metal is aluminum.